United States Patent [19]

Eyler

[11] Patent Number: 4,494,162
[45] Date of Patent: Jan. 15, 1985

[54] STARTER THERMAL OVERLOAD PROTECTION SYSTEM

[75] Inventor: Francis R. Eyler, Hanover, Pa.

[73] Assignee: Harsco Corporation, Harrisburg, Pa.

[21] Appl. No.: 316,640

[22] Filed: Oct. 30, 1981

[51] Int. Cl.$^3$ .............................................. H02H 5/04
[52] U.S. Cl. ........................................ 361/29; 361/23; 361/96; 361/97; 123/179 R
[58] Field of Search ....................... 361/23, 22, 24, 26, 361/25, 29, 32, 105, 96, 97; 123/179 R, 179 F, 179 A, 179 B, 179 C; 290/38 C, 37 R; 318/471, 447, 472, 473, 434

[56] References Cited

U.S. PATENT DOCUMENTS

| | | |
|---|---|---|
| 3,230,401 | 1/1966 | Stelter . |
| 3,259,753 | 7/1966 | McWhirter . |
| 3,325,657 | 6/1967 | Corey . |
| 3,543,039 | 11/1970 | Mosier . |
| 3,681,658 | 8/1972 | Naoi et al. . |
| 3,823,701 | 7/1974 | Tuji . |
| 3,921,613 | 11/1975 | Thirion . |
| 4,024,408 | 5/1977 | Coleman et al. . |
| 4,032,792 | 6/1977 | Parkyn et al. . |
| 4,079,432 | 3/1978 | Godfrey ............................ 361/22 X |
| 4,128,854 | 12/1978 | Ruminsky ............................ 361/22 |
| 4,131,304 | 12/1978 | Wagner . |
| 4,188,931 | 2/1980 | Waterhouse . |
| 4,315,295 | 2/1982 | Zocholl ................................. 361/96 |

Primary Examiner—Reinhard J. Eisenzopf
Attorney, Agent, or Firm—Kerkam, Stowell, Kondracki & Clarke

[57] ABSTRACT

A system for protecting the starter of an internal combustion engine from overheating as a result of cranking for an excessive period of time when the engine is difficult to start. Override circuitry is electrically interposed between a manually operable starter switch and the engine starter to apply a prescribed ON and OFF cranking sequence to the starter and thereby limit the duty cycle even though the operator continuously operates the switch. Preferably, the overall maximum duration of the start attempt (the duration of the ON and OFF cranking sequence) is limited by termination circuitry. The ON and OFF cranking intervals and, optionally, the overall maximum duration of the start attempt are particularly selected so as to allow sufficient time for motor winding heat to dissipate into the starter housing. This limited cranking duty cycle protects the starter from overheating. Also, when employed in combination with a thermostatic switch mounted on the starter housing and arranged to prevent starter energization when a predetermined temperature is reached, the limited starter ON time and intermediate resting periods permit the housing and the thermostatic switch to more closely follow winding temperature. As a further aspect, in order to maintain optimum operation of the protection system as starter load conditions vary, starter current is sensed and the starter ON/OFF duty cycle is appropriately modified in response.

2 Claims, 3 Drawing Figures

STARTER THERMAL OVERLOAD PROTECTION SYSTEM

BACKGROUND OF THE INVENTION

The present invention relates generally to protection of the starter of an internal combustion engine, for example as employed in motor vehicles and military equipment, and, more particularly, for protecting a starter from overheating as a result of cranking for an excessive period of time when the engine is difficult to start.

A particular problem encountered when starting internal combustion engines, particularly for vehicles, is an enormous buildup of heat in the starter windings when the engine is difficult to start and the starter is energized for an excessive period of time. Due to the rapid rate at which heat is generated in the windings and the time required for heat conduction, the windings can become excessively hot to the point of damage even though the temperature of the starter housing is relatively cool.

One previous solution has been to provide thermostatic switches mounted on the starter housing for preventing starter energization when a predetermined temperature is reached. While such switches offer some protection, they are not an entirely reliable means of protection due to the temperature differential between the heat-producing starter windings and housing, and due to variations in ambient temperature.

In an effort to avoid this problem, operators' manuals for some equipment prescribe specific starting procedures, which include instructions to limit cranking time, and to provide adequate cooling off intervals between starter actuations. A typical such specification provides for a two-to-one off-to-on time ratio.

However, dependency upon an operator following instructions, or even necessarily being aware of the instructions, in many instances provides less than satisfactory protection. Accordingly, there exists a need for automatic protection systems which provide greater protection than does a thermostatic switch mounted on the starter housing and which do not rely upon an operator following instructions.

Although not directed to the protection of motor vehicle starters from overheating, of some pertinancy in view of the specific solution of the present invention are certain systems for automatically starting a vehicle at predetermined time such as might be controlled by a clock. Four such systems are disclosed to Stelter U.S. Pat. No. 3,230,401, Corey U.S. Pat. No. 3,325,657, McWhirter U.S. Pat. No. 3,259,753, and Waterhouse U.S. Pat. No. 4,188,931. By way of specific example, in the automatic vehicle starting system of the Waterhouse patent, in the event the engine does not immediately start, the starting sequence is repeated over and over for a certain period of time. In Waterhouse, in order to closely simulate manual automobile starting procedures, and to minimize the likelihood of the automobile battery becoming excessively discharged, the starter motor is for example automatically cranked for thirty seconds ON and the ten seconds OFF, for an overall period of six to eight minutes.

SUMMARY OF THE INVENTION

It is an object of the invention to avoid damage from overheating the windings of an electric starter of an internal combustion engine as a result of the operator energizing the starter for an excessive period of time when the engine is difficult to start.

It is another object of the invention to provide such a protection system which is relatively inexpensive, and which may be added or retrofitted with minimal difficulty to any conventional starter circuit.

Briefly, and in accordance with an overall concept of the invention, override circuitry is electrically interposed between the manually operable starter switch and the starter to automatically apply a prescribed ON and OFF cranking sequence to the starter, all the while and even though the vehicle operator continuously operates the start switch. In other words, the override circuitry limits the cranking duty cycle. The ON and OFF cranking intervals, and, preferably, the overall maximum duration of the start attempt, are particularly selected so as to allow sufficient time for motor winding heat to dissipate into the starter housing.

It is a further overall concept of the invention that this limited duty cycle may be advantageously employed in either of at least two manners, or both. The first manner is simply to rely on the limited duty cycle itself to protect the starter from overheating, as might be expected when a vehicle operator followed prescribed starting procedures. Secondly, the override may be employed in combination with a conventional thermostatic switch mounted on the starter housing and connected to prevent starter energization when a predetermined temperature is reached. In this case, the limited starter ON time and the intermediate resting periods permit the housing and therefore the thermostatic switch to more closely follow the winding temperature, and thereby provide much more reliable protection than otherwise would be the case.

Briefly, and in accordance with another overall concept of the invention, it is recognized that load on the starter and consequent heating rate varies significantly with engine operating conditions, particularly ambient temperature, and that, for optimum operation of the subject protection system, the starter ON/OFF duty cycle should be appropriately modified dependent upon conditions. As a specific example, at cold ambient temperatures engine oil becomes thicker, increasing the load on the starter. Typically, with an ambient temperature decrease from 30° F. to 0° F. current drawn by the starter doubles. Since winding heat losses are $I^2R$ losses, four times as much heat is generated at the lower temperature. For an optimum protection system, this increase in heat generated must be taken into account. In accordance with the invention, then, starter currrent is sensed and, through appropriate circuitry, utilized to modify the ON-to-OFF timing ratio as an inverse function of sensed current. That is, as sensed current increases, the ON-to-OFF timing ratio decreases, decreasing the cranking duty cycle.

Briefly, and in accordance with a more particular aspect of the invention, there is provided a device for protecting an electric starter from overheating during extended cranking periods in an internal combustion engine starting system of the type including a power source, an electric starter including motor windings within a housing, and a manually operable starter switch for selectively energizing the starter relay from the power source. In accordance with the invention, the device comprises override circuitry electrically interposed between the starter switch and the starter. The override circuitry is arranged to limit the energization of the starter and consequent engine cranking to a predetermined timing sequence of alternating ON intervals and OFF intervals even though the operator continuously operates the start switch. In accordance with the invention, the predetermined timing sequence is selected so as to allow sufficient time for motor winding heat to dissipate into the starter housing. Advantageously, this prevents excessive winding temperature regardless of the starting procedure utilized by the operator.

Briefly, and in accordance with another more particular aspect of the invention, in combination with the override circuitry a thermostatic switch is mounted on the starter housing and connected to prevent starter energization when a predetermined temperature is reached. The enforced ON/OFF duty cycle of starter energization permits the thermostatic switch to more closely follow winding temperature, with the result that the thermostatic switch may more effectively protect the starter windings from overheating.

Briefly, and in accordance with yet another particular aspect of the invention, the protective device includes termination circuitry for inhibiting further starter energization following a predetermined duration of the alternating ON/OFF timing sequence. Preferably, there is included timing circuitry for preventing immediate operator resetting of the termination circuitry.

In the preferred embodiments of the invention, the protective device including override circuitry and termination circuitry derives all of its operating voltage from the vehicle power source through the starter switch, thereby obviating the need for additional supply connections with attendant complexity. Moreover, the circuit arrangement is such that even though the operating voltage is so derived, the termination circuitry cannot be reset by the operator simply releasing the start switch for a brief period of time. By way of specific example, without intending to limit the scope of the claimed invention, in one particular embodiment, once the termination circuitry has operated, an approximately thirty minute wait is required before the system will again permit the full number of ON and OFF cranking cycles.

In accordance with one specific embodiment of the invention, the override circuitry comprises an astable multivibrator including an RC timing network for determining the ON and OFF times. The termination circuitry comprises a timing capacitor, and a timing resistor connected in series between an output of the override circuitry and the timing capacitor such that the timing capacitor is charged through the timing resistor during ON timing intervals. For limiting the discharge rate of the timing capacitor, particularly during OFF timing intervals and during periods when the vehicle start switch is not actuated, a diode is provided in the capacitor circuit. The termination circuitry additionally includes a voltage threshold detector connected to timing capacitor for generating a signal when the timing capacitor has charged to a predetermined voltage, and output circuitry responsive to the threshold detector signal connected to inhibit further energization of the starter.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENTS

Figure 1:
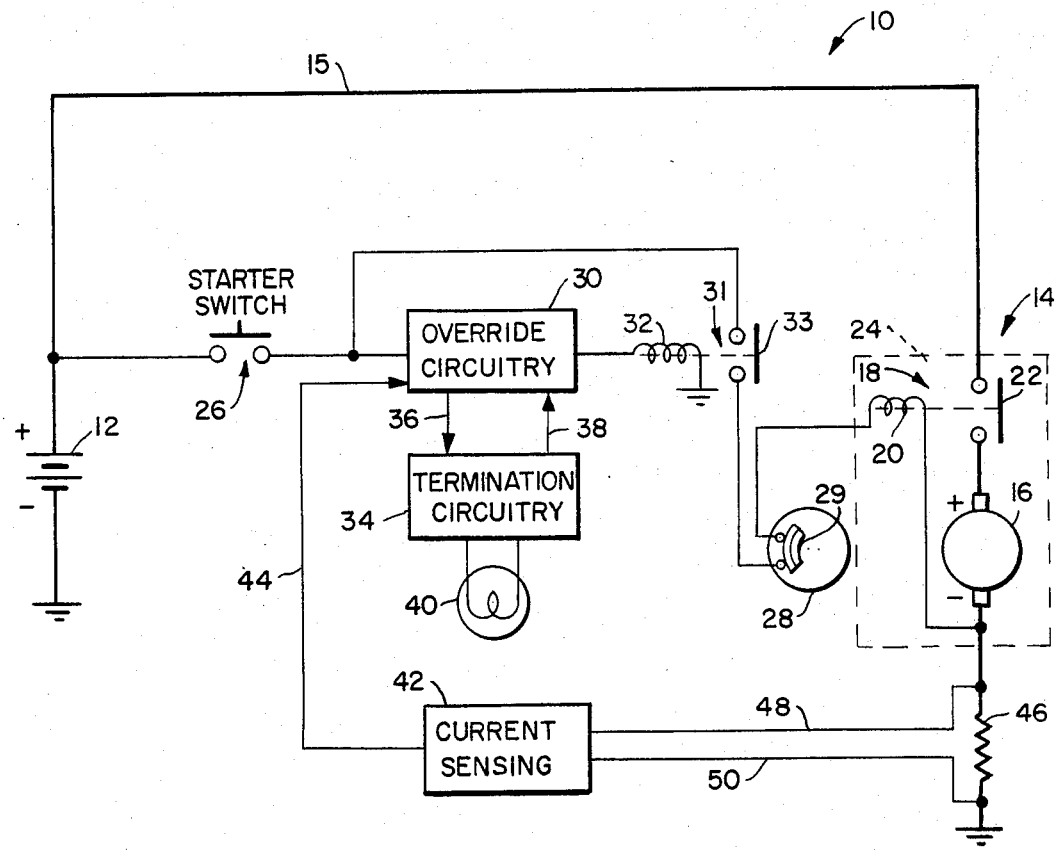
FIG. 1 is an overall block diagram of an internal combustion engine starting system including the present invention, and illustrating various options available.

Referring first to FIG. 1, an internal combustion engine starting system, generally designated 10, is of the type including a power source, shown as a vehicle battery 12, and a conventional electric starter 14 supplied from the battery through a heavy cable 15. The electric starter 14 is of the type including motor windings in the form of an armature 16 and an integral starter solenoid 18 comprising a coil 20 and contacts 22 for applying voltage from the battery 12 to the armature 16 when the starter solenoid coil 20 is energized, all included within a case or housing 24. The housing 24 has a relatively large thermal mass. It will be appreciated. however, that the present invention is also readily applicable to starters of the type which employ an external solenoid. Another conventional element is a manually operable starter switch 26 connected generally for selectively energizing the solenoid coil 20 and thus the starter 14 from the vehicle battery 12.

Depending upon the particular option selected in accordance with the invention, there may also be provided a thermostatic switch 28 illustratively comprising a bimetallic element 29 mounted on the starter housing 24 in thermal contact therewith, and connected to prevent energization of the starter 14 when a predetermined temperature is reached. As shown in FIG. 1, for this purpose the contacts of the thermostatic switch 28 may simply be connected in series with the starter solenoid coil 20.

Figure 2:
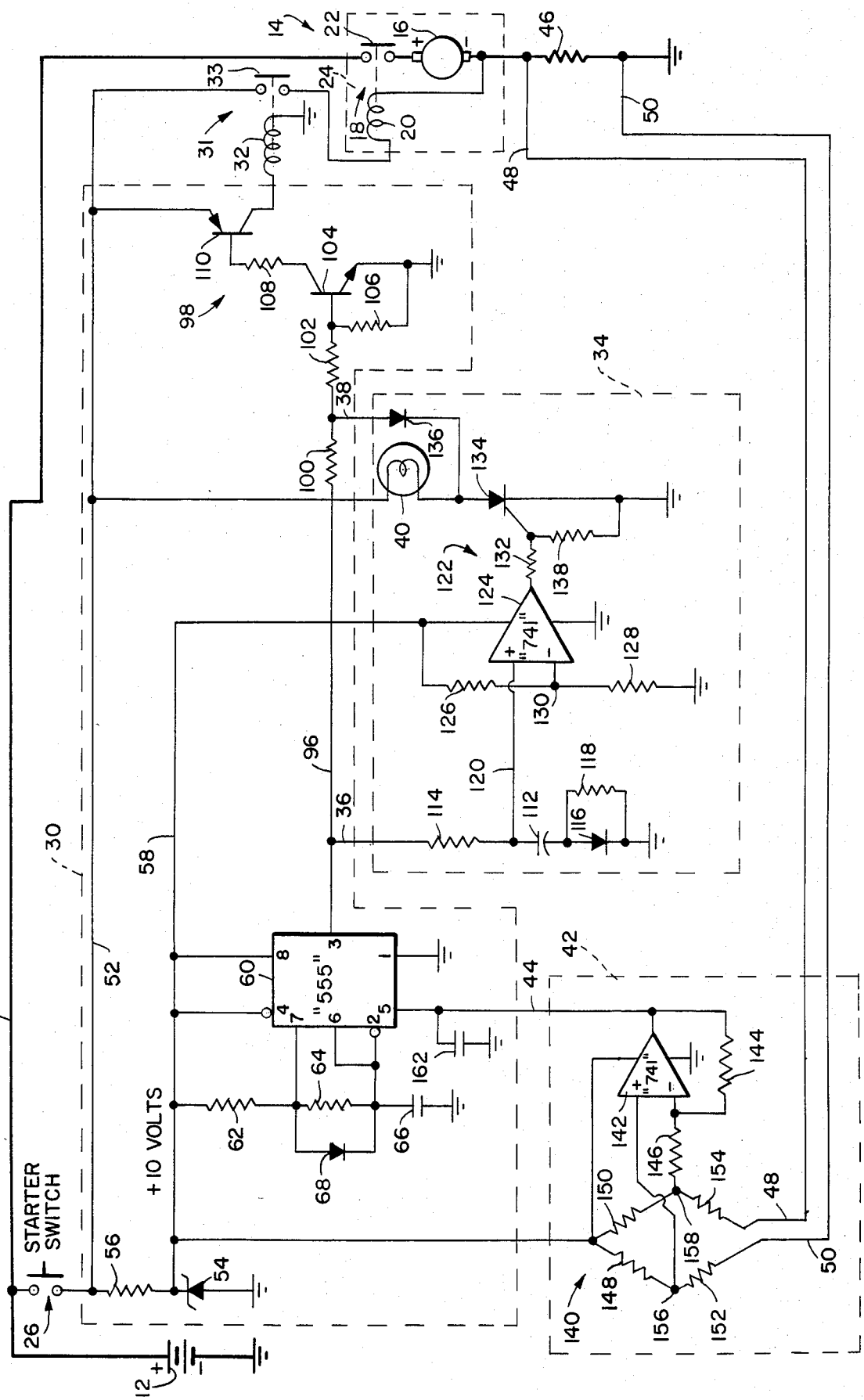
FIG. 2 is a detailed schematic diagram depicting circuitry in accordance with one particular embodiment of the invention.

In accordance with the invention, override circuitry 30, described hereinbelow in detail with reference to FIG. 2, is electrically interposed between the starter switch 26 and the starter solenoid coil 20. In the particular circuit arrangement described herein, the override circuitry 30 includes as an output element a starter relay 31 comprising a coil 32 and contacts 33 connected, when activated, to energize the starter solenoid coil 20 through the starter switch 26.

The override circuitry 30 is generally arranged to limit energization of the starter 14 and consequent engine cranking to a predetermined alternating ON/OFF timing sequence, even though the operator continuously operates the start switch 26. The ON/OFF timing sequence is selected so as to allow sufficient time for motor winding heat generated within the armature 16 to dissipate into the starter housing 24, which typically has a fairly high thermal mass. In operation, this action of the override circuitry 30 may either serve by itself to prevent excessive temperatures of the armature 16 windings or, when employed in combination with the thermostatic switch 28, render the thermostatic switch more effective in responding to actual starter winding 16 temperature.

Although the precise ON/OFF duty cycle and overall period is highly dependent upon the particular starting system and application, as an illustrative example without intending to limit the scope of the invention, in one particular case the alternating ON/OFF timing sequence is in the order of fifteen seconds ON and thirty seconds OFF.

Also shown in the FIG. 1 block diagram is termination circuitry 34 for inhibiting further energization of the starter 14 following a predetermined duration of the alternating ON/OFF timing sequence. The termination circuitry receives information via a line 36 from the override circuitry 30 concerning when the starter 14 is being actuated, and performs its inhibiting function most conveniently by means of direct connection into the override circuitry 30 via a line 38. The termination circuitry 34 also drives an indicator lamp 40 in order to inform the vehicle operator when the termination circuitry 34 has acted.

It will be appreciated that the specific timing parameters of the termination circuitry 34 also must be determined in light of the specific vehicular application, the characteristics of the particular starter, and the load the engine presents. Again, for illustrative purposes only and without intending to limit the scope of the claimed invention, a typical timing interval for the termination circuitry 34 may permit approximately seven ON cranking cycles of the override circuitry 30.

The final element depicted in FIG. 1 is provided in order to modify the ON/OFF cranking duty cycle as a function of starter current, which in turn is a function of engine operating conditions such as ambient temperature. Specifically, starter current sensing circuitry 42 is connected to modify the duty cycle of the override circuitry 30 via a control line 44. In order to sense starter current, a current sensing resistor 46 is connected in series with the ground connection of the starter 14. Due to the relatively high currents, only a very low resistance is required to develop adequate voltage drop for sensing purposes, for example 0.001 ohms, and this may simply comprise normal cable resistance. In the particular vehicle for which the subject invention is intended, a ground cable is used for the starter 14, and this provides a convenient means for sensing current. It will be appreciated, however, that current in the battery cable 15 may instead be sensed where there is no ground cable. Voltage drop across the current sensing resistor 46 is sensed via sense leads 48 and 50 which, it should be noted, in order to avoid errors caused by voltage drops in connections subject to unpredictable variations, are connected to the length of battery cable comprising the sensing resistor 46 on the cable (resistor) side of the connections.

In operation, the current sensing circuitry 42 automatically modifies override circuitry 30 and thus the starter 14 ON-to-OFF ratio for optimum operaton under different load conditions. As stated hereinabove, as ambient temperature lowers, the load on the starter increases substantially, resulting in increased armature current flow and heat generation which increases in proportion to the square of current. This increased current flow is sensed by the circuitry 42, which appropriately decreases the ON-to-OFF ratio.

As may be seen from FIG. 1, and as will become more apparent from the detailed schematic diagram of FIG. 2 discussed hereinbelow, the circuitry of the subject protective device, namely, the override circuitry 30, the termination circuitry 34, and the current sensing circuitry 42, is all supplied from the power source 12 through the starter switch 26, obviating the need for any separate power supply connection. This is a significant feature in simplifying connection to a vehicle.

Referring now to FIG. 2, there is shown a detailed schematic diagram of exemplary circuitry for practicing the invention. FIG. 2 differs slightly from FIG. 1 in that, to depict another option, the thermostatic switch 28 on the starter 14 housing 24 is omitted. The starter relay 31 contact 33 is thus connected directly to the starter solenoid coil 20.

The inventive circuitry of FIG. 2 is all powered from the battery cable 15 through the starter switch 26 which, when actuated, applies battery voltage to a supply line 52. Preferably, for stable operation, and also to limit the voltage applied to the circuitry, the timing portions of the FIG. 2 circuitry are powered by regulated DC voltage. Specifically, a simple voltage regulator is provided comprising a ten-volt Zener diode 54 and a series voltage dropping resistor 56 connected between the supply line 52 and circuit ground, and supplies a regulated +10 VOLT line 58.

In FIG. 2, the override circuitry 30 specifically may be seen to comprise an astable multivibrator circuit, for convenience built around a commercially-available "555" timer monolithic integrated circuit (IC) 60. Pin numbers shown for the timer IC 60 are those for eight-pin, dual inline package (DIP). It will be appreciated that such integrated circuits are available from a variety of manufacturers, under similar type numbers, such as Signetics Type No. NE555, Motorola Type No. MC1555, and Texas Instruments Type No. SE555.

The positive DC Supply Pin 8 of the IC 60 is connected to the +10 VOLT supply line 58, and the IC Ground Pin 1 is connected to circuit ground. The Reset Pin 8 is unused in this particular circuit, and thus tied to the +10 VOLT line 58. Pin 3 is the output of the IC 60.

For determining the period and duty cycle of the timer, an RC network comprising timing resistors 62 and 64, and timing capacitor 66 is connected between the +10 VOLT supply conductor 58 and circuit ground. To effectively bypass the timing resistor 64 when the timing capacitor 66 is charging, a diode 68 is connected in parallel with the timing resistor 64. The inclusion of the bypass diode 68 in general allows non-interactive selection of ON and OFF timing intervals through selection of timing resistors 62 and 64 respectively, and is particularly advantageous in the present circuit because it permits the OFF interval to be made longer than the ON interval. The junction of the lower timing resistor 64 and the capacitor 66 is connected to sensing Pins 6 and 2 of the IC 60, conventionally termed the "Threshold" Pin 6 and the "Trigger" Pin 2.

Figure 3:
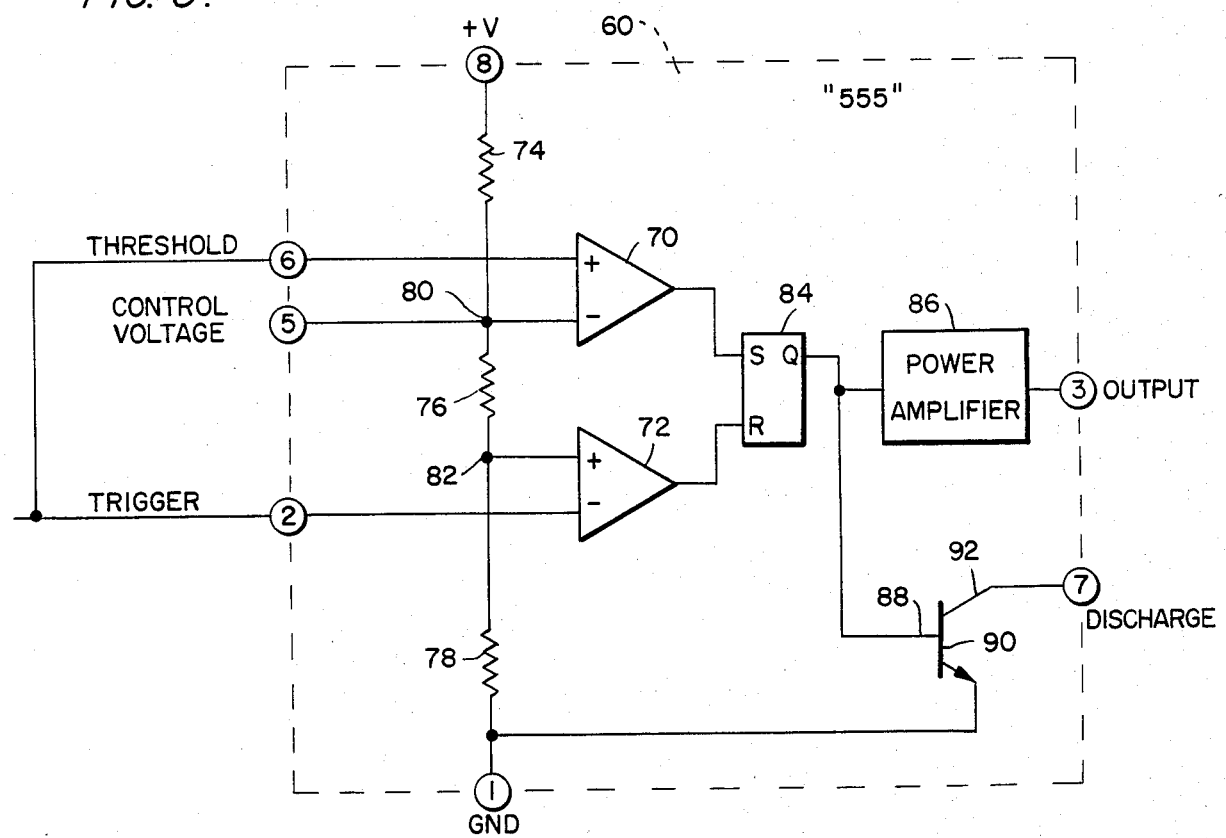
FIG. 3 is functional block diagram of a commercially-available "555" integrated circuit timer advantageously employed in the practice of the present invention.

Referring briefly to FIG. 3, as an aid in understanding the operation of the present invention there is shown a simplified block diagram of a typical commercially-available "555" IC timer. The IC timer internal reset circuitry, not employed in the circuit of the subject invention, is for clarity omitted from FIG. 3.

As shown, the "555" timer includes a pair of comparators, upper comparator 70 and lower comparator 72, connected to a reference voltage divider comprising equal-valued series-connected resistors 74, 76, and 78, each for example having a value of 5K Ohm. These resistors 74, 76, and 78 are connected between the positive Supply Pin 8 and the Ground Pin 1. Thus, an upper reference voltage level established at the upper node 80 between the resistors 74 and 76 is nominally equal to ⅔ the supply voltage, and a lower reference voltage level established at the lower node 82 between the resistors 76 and 78 is nominally at ⅓ the supply voltage. The reference voltage at the node 80 is as stated only in the absence of any input on the Control Voltage Pin 5 which, as is discussed hereinafter, is advantageously utilized in the practice of the present invention for duty cycle modulation as a function of starter 14 current.

For the upper comparator 70, the inverting (−) input is employed as a reference input, and accordingly is connected to the voltage divider upper node 80. For the lower comparator 72, the non-inverting (+) input is employed as a reference input, and connected to the lower voltage divider node 82.

The outputs of the comparators 70 and 72 are respectively connected to Set (S) and Reset (R) inputs of a Set-Reset flip-flop 84. The Q output of the flip-flop 84 is connected to the input of a power amplifier 86 which drives the Output Pin 3, as well as to the base terminal 88 of an NPN switching transistor 90, the collector 92 of which is connected to the Discharge Pin 7. The transistor 90 emitter is connected to the IC Ground Pin 1. The internal connections are such that the Discharge Pin 7 follows the Output Pin 3. That is, they are both high at the same time and low at the same time, although it will be apparent that the Discharge Pin 7 is connected as a open-collector output.

Referring now again to FIG. 2, in operation the "555" IC 60, through its Pins 2 and 6, senses the voltage on the timing capacitor 66. Depending upon the voltage so sensed the "555" IC either open circuits its Discharge Pin 7, or internally grounds Pin 7 through the FIG. 3 transistor 90. When Pin 7 is open, the timing capacitor 77 charges through the timing resistor 62 and the bypass diode 68 toward the potential on the +10 VOLT supply line 58. Assuming for the moment that there is no input on the control voltage Pin 5, when the voltage on the timing capacitor 66 reaches ⅔ of the DC supply voltage, as sensed by Threshold Pin 6, the Discharge Pin 7 goes low, and the the timing capacitor discharges through the timing resistor 64. When the timing capacitor 66 voltage falls to ⅓ of the DC voltage as sensed by Trigger Pin 2, the Discharge Pin 7 again open circuits, to continue the oscillation cycle.

As discussed above with reference to FIG. 3, output is provided at the same time by virtue of the internal arrangement of the IC 60 whereby the Output Pin 3 is high when the Discharge Pin 7 is open and the capacitor 66 is charging, and the Output Pin 3 is low when the Discharge Pin 7 is low and the timing capacitor 66 is discharging. As a result, the $R_{62}C_{66}$ time constant determines the length of the interval when the Output Pin 3 is high, and the $R_{64}C_{66}$ time constant determines the length of the interval when the Output Pin 3 is low. Through suitable selection of these timing components, various duty cycles may be selected.

This output duty cycle and timing determines ultimately the cranking ratio of ON-to-OFF time, and therefore the cranking sequence. As will be apparent from the remainder of the circuitry, when the Output Pin 3 is high, the engine may be cranked, and when the Output Pin 3 is low, energization of the starter 14 and engine cranking is prevented. The exact ratio of ON-to-OFF time for both optimum starter protection and engine startup dependes upon a particular starter used and the load the engine presents. Accordingly, the timing components must be selected to suit a particular application. By way of example, with the component values presented in a table hereinbelow, the starter ON time when the Output Pin 3 is high is approximately fifteeen seconds, and the starter OFF time when the Output Pin 3 is low is in the order of thirty seconds.

Different timing intervals may readily be selected for particular application through selection of the values of the timing components, resistors 62 and 64, and capacitor 66. Specifically, the duration of the ON timing intervals, in seconds, is $0.693\ R_{62}C_{66}$. The duration of the OFF timing intervals is $0.693\ R_{64}C_{66}$.

The "555" timer IC 60 Output Pin 3 is connected via a line 96 to a transistor switching circuit 98 for energizing the starter relay 31 coil 32, and thus the starter solenoid coil 20, when the Output Pin 3 is high. Specifically, the line 96 is connected through current-limiting resistors 100 and 102 to the base of an NPN switching transistor 104 having its emitter connected to circuit ground. A biasing resistor 106 is connectd betweeen the transistor 104 base and emitter terminals.

The collector of the NPN switching transistor 104 is connected through a resistor 108 to the base of a PNP power transistor 110 having its emitter terminal connected directly to the unregulated supply line 52 which is energized whenever the starter switch 26 is operated. Finally, the power transistor 110 collector terminal is connected to the starter relay 31 coil 32, the opposite terminal of which is connected to circuit ground. The contacts 33 of the starter relay 31 energize the solenoid coil 20 from the unregulated supply line 52, in turn supplied from the battery 12 through the starter switch 26.

In operation, when the IC 60 Output Pin 3 is high, the transistor 104 is biased into conduction, pulling the power transistor 110 base voltage towards its collector voltage and causing the power transistor 110 in turn to switch into conduction, energizing the coil 32. When the "555" timer IC 60 Output Pin 3 is low, the NPN switching transistor 104 turns off, removing forward bias from the base of the power transistor 110. The starter relay 31 coil 32, and thus the starter 14, cannot be energized, even though the starter switch 26 is operated.

Considering now the FIG. 2 termination circuitry 34, this circuitry 34 includes a timing capacitor 112 and a timing resistor 114 connected in series to the line 36, which, as may be seen in FIG. 2, is connected to the override circuitry 30 output line 96. The opposite terminal of the timing capacitor 112 is connected to circuit ground through the parallel combination of a charging diode 116 and a discharging resistor 118 such that the timing capacitor 112 is charged through the timing resistor 114 and diode 116 during ON timing intervals when the "555" IC 60 Output Pin 3 is high. The discharge rate of the timing capacitor 112 is limited by forcing the timing capacitor 112 to discharge through the resistor 118, which has a relatively high resistance value.

Connected to the timing capacitor 112 via a line 120 is a voltage threshold detector, generally designated 122, for generating a signal when the timing capacitor 112 has charged to a predetermined voltage level. More particularly, the voltage threshold detector 122 comprises a comparator 124 in the form of an appropriately connected "741" integrated circuit operational amplifier, also commercially available from a variety of manufacturers. The "741" comparator 124 is powered from the +10 VOLT supply line 58 as shown by the direct supply connection. The ground supply connection for the "741" comparator 124 is connected to circuit ground.

A reference voltage divider comprises resistors 126 and 128 connected in series between the +10 VOLT line 58 and circuit ground. The inverting (−) input of the comparator 124, utilized as the reference input, is connected to the junction 130 between these two resistors 126 and 128. In this particular circuit, the reference bias at the junction 130 is approximately 6.4 volts.

The output of the "741" comparator 124 is connected through a current-limiting resistor 132 to the gate of a silicon controled rectifier (SCR) 134 having its cathode connected to circuit ground. The SCR 134 anode is connected as an output to the indicator lamp 40, and through an isolation diode 136 and via line 38 to the junction of current-limiting resistors 100 and 102 within the override circuitry 30. Finally, to reliably keep the SCR 134 gated in its non-conducting state when the starter 14 should be allowed to be energized, a biasing resistor 138 is connected between the SCR 134 gate and cathode terminals.

In the operation of the termination circuitry 34, during those periods when Output Pin 3 of the "555" timer IC 60 is high, the timing capacitor 112 charges through the timing resistor 114 and the diode 116. After a predetermined length of charging time corresponding to a predetermined number, for example seven, of timing cycles from the "555" timer IC 60, the voltage of the timing capacitor 112 applied to the comparator 124 non-inverting (+) input exceeds the reference voltage applied to the inverting (−) input and the comparator 124 output goes high. This gates the SCR 134 into conduction, energizing the indicator lamp 40 to inform the vehicle operator that the termination circuitry has taken effect. Additionally, through the isolation diode 136 and the line 38, the junction of the resistors 100 and 102 is pulled low, keeping the base of the switching transistor 104 clamped low such that the switching transistor 104 cannot conduct regardless of the output state of the "555" timer IC 60. With the particular circuit component values provided herein, the timing capacitor 112 charges up to the 6.4 volt threshold level in nominally one hundred nine seconds of accumulated ON cranking time. With a two-to-one ratio of OFF-to-ON time, the total real or actual time is three times this, or three hundred twenty seven seconds.

The resistors 62 and 64 and capacitor 66 comprise a first electronic timing network within the override circuitry 30, whereas the capacitor 12, resistor 114, diode 116 and resistor 118 may be considered as a second electronic timing network within the termination circuitry 34. Both of these electronic timing networks functon to elecronically determine time intervals. More specifically, these first and second electronic timing networks use respective first and second capacitors (66 and 112) as electronic storage components for time interval determination by sensing the change in capacitor charge over time. As shown in FIG. 2, both of these electronic storage elements are supplied with their operating voltage by way of the starter switch 26.

A particular advantage of the arrangement of the termination circuitry 34, specifically that of the network associated with the timing capacitor 112 and timing resistor 114 is that, in the event the operator tries to reset the system immediately after it terminates by opening and reclosing the starter switch 26, the system immediately terminates cranking again because the timing capacitor 112 is still charged. Moreover, in order for the operator to reapply a full seven-cycle cranking sequence as mentioned above, he must wait for the timing capacitor 112 to fully discharge, which, with the particular circuit component values described herein, requires approximately thirty minutes. The timing capacitor 112 discharge time constant is intentionally much longer than its charge time constant in order to allow for the vehicle starter armature 16 to cool before the full starting sequence can be reapplied. If the operator attempts to restart before this thirty minutes is up, he is able only to apply a partial starting sequence before the capacitor 112 again charges to the threshold level, and the system again terminates.

Accordingly, it will be appreciated the system in a sense has partial memory capability, even though fully de-energized when the starter switch 26 is open, and further protects the vehicle starter by forcing a cool-down time upon the operator once the system has initially terminated.

The remaining circuitry depicted in detail in FIG. 2 is the current sensing circuitry 42 which, as mentioned above with reference to FIG. 1, senses, via conductors 48 and 50, voltage drop across a current sensing resistor 46, preferably comprising the starter 14 ground lead. It will be appreciated, however, that numerous other current sensing techniques may be employed, and there is no intention to limit the scope of the claimed invention to the particular technique disclosed herein.

In FIG. 2, the current sensing circuit 42 obtains its operating power from the +10 VOLT regulated supply conductor 58, and thus also is energized only when the starter switch 26 is actuated. The current sensing circuitry 42 comprises a resistor bridge network 140 and a "741" operational amplifier 142, which may be included within the same integrated circuit package as the comparator 124. In order to provide amplification rather than mere threshold switching, a negative feedback resistor 144 is connected between the operational amplifier 142 output terminal and its inverting (−) input terminal, and an input resistor 146 is connected in series with the inverting (−) input terminal.

The resistor bridge 140 includes upper resistors 148 and 150, and lower resistors 152 and 154. Output nodes 156 and 158 of the resistor bridge 140 are connected respectively to the operational amplifier 142 non-inverting (+) input, and through the input resistor 146 to the operational amplifier 142 inverting (−) input. Thus, as the voltage of the output node 158 increases with respect to the voltage of the output node 156, the output voltage of the operational amplifier 142 decreases, the amplification factor being determined by the ratio of the feedback resistor 144 to the series input resistor 146.

The output line 44 from the current sensing circuit is connected to the Control Voltage Pin 5 of the "555" timer IC 60 within the override circuitry 30. For best noise immunity, a bypass capacitor 162 is connected between the Control Voltage Pin 5 and circuit ground.

The voltage drop across the sensing resistor 46 is applied via leads 48 and 50 in series with the lower right bridge resistor 154 such that, as starter armature current increases, the voltage at the output node 158 increases with respect to node 156, causing the amplifier 142 output and thus the output line 44 of the current sensing circuit 42 to go lower.

The manner in which the current sensing circuit 42 modifies the ON/OFF duty cycle of the override circuitry 30 will now be explained with reference, again, to FIG. 3. Internally of the "555" timer IC 60, the Control Voltage Pin 5 is connected to the reference node 80 on the voltage divider, thereby permitting the upper comparator reference voltage in particular to be varied from its nominal ⅔ of the supply voltage. Decreasing the upper comparator 70 reference voltage such that it is lower than the nominal ⅔ supply voltage, shortens the length of time the Output Pin 3 is high or ON. Similarly, increasing the voltage on Control Voltage Pin 5 has the effect of increasing the length of the output ON time, as should occur when sensed starter current decreases.

Accordingly, it will be appreciated that this particular connection to the "555" timer IC 60 provides a convenient means of modifying the ON/OFF duty cycle as an inverse function of starter current.

The following table lists component values which are believed to be suitable in the circuits described herein. It will be appreciated, however, that these component values, as well as the circuits themselves, are exemplary only, and are provided to enable those skilled in the art to practice the invention without undue experimentation:

| TABLE OF EXEMPLARY COMPONENT VALUES | |
|---|---|
| Resistors | |
| 56 | 150 Ohm |
| 62,144 | 100 K Ohm |
| 64 | 200 K Ohm |
| 100,102,108,132 | 1 K Ohm |
| 106 | 270 Ohm |
| 114 | 91 K Ohm |
| 118 | 1.5 Meg. Ohm |
| 126,146 | 10 K Ohm |
| 128 | 18 K Ohm |
| 138 | 330 Ohm |
| 148,150 | 1 K Ohm, 0.1% |
| 152,154 | 2 K Ohm, 0.1% |
| Capacitors | |
| 66 | 225 mfd. |
| 112 | 1200 mfd. |
| 162 | 0.01 mfd. |

It will be apparent, therefore, that the present invention provides inexpensive and effective means for protecting a vehicle starter from overheating as a result of the operator attempting to energize the starter for an excessive period of time when the engine is difficult to start.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In an internal combustion engine starting system of the type including a power source, an electric starter including motor windings within a housing, and a manually operable starter switch for selectively energizing the starter from the power source, a device for protecting the electric starter from overheating during extended cranking periods, said device comprising:

override circuitry electrically interposed between the starter switch and the starter, said override circuitry arranged to limit energization of the starter and consequent engine cranking to a predetermined timing sequence of alternating ON intervals and OFF intervals even though the operator continuously operates the starter switch, the predetermined timing sequence being selected so as to allow sufficient time for motor winding heat to dissipate into the starter housing to prevent excessive winding temperatures, and current sensing circuitry for sensing current drawn by the electric starter and for modifying the ON to OFF time ratio of said override circuitry as an inverse function of sensed starter current.

2. In an internal combustion engine starting system of the type including a power source, and electric starter including motor windings within a housing, a thermostatic switch mounted on the starter housing and connected to prevent starter energization when a predetermined temperature is reached, and a manually operable starter switch for selectively energizing the starter from the power source, a device for permitting the thermostatic switch to more closely follow winding temperature during extended cranking periods, said device comprising:

override circuitry electrically interposed between the starter switch and the starter, said override circuitry arranged to limit energization of the starter and consequent engine cranking to a predetermined timing sequence of alternating ON intervals and OFF intervals even though the operator continuously operates the start switch, the predetermined timing sequence being selected so as to allow sufficient time for motor winding heat to dissipate into the starter housing such that starter housing temperature better follows winding temperature; and current sensing circuitry for sensing current drawn by the electric starter and for modifying the ON to OFF time ratio of said override circuitry as an inverse function of sensed starter current.

* * * * *